(12) United States Patent  (10) Patent No.: US 7,537,400 B2
Schmid  (45) Date of Patent: May 26, 2009

(54) CAMERA SYSTEM FOR A MOTOR VEHICLE

(75) Inventor: Bernhard Schmid, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 312 days.

(21) Appl. No.: 11/583,933

(22) Filed: Oct. 20, 2006

(65) Prior Publication Data

US 2007/0201860 A1  Aug. 30, 2007

(30) Foreign Application Priority Data

Oct. 21, 2005  (DE) .................. 10 2005 050 363

(51) Int. Cl.
  *G03B 17/00* (2006.01)
  *H04N 7/18* (2006.01)
(52) U.S. Cl. ...................... 396/419; 348/148
(58) Field of Classification Search ................ 396/429, 396/427; 348/118, 148
  See application file for complete search history.

(56) References Cited

U.S. PATENT DOCUMENTS

| 2005/0099272 A1* | 5/2005 | Kuo et al. ............... 340/426.1 |
| 2006/0050149 A1 | 3/2006 | Lang et al. |
| 2006/0064208 A1 | 3/2006 | Lang et al. |

FOREIGN PATENT DOCUMENTS

| DE | 198 16 821 A1 | 10/1998 |
| DE | 198 16 822 A1 | 10/1998 |
| DE | 198 57 113 A1 | 6/2000 |
| DE | 100 26 596 C1 | 12/2001 |
| DE | 101 13 134 A1 | 9/2002 |
| DE | 101 60 651 A1 | 6/2003 |
| DE | 10 2004 045 974 A1 | 9/2004 |
| DE | 20 2004 013 984 U1 | 9/2004 |
| DE | 20 2005 007 509 U1 | 9/2005 |
| EP | 1471483 A1 * | 10/2004 |
| JP | 2004-235964 A | 8/2004 |

OTHER PUBLICATIONS

German Search Report dated Aug. 8, 2006 with the English Translation (Nine (9) Pages).
European Search Report dated Feb. 7, 2008 w/English translation of pertinent portion (seven (7) pages).

* cited by examiner

*Primary Examiner*—W.B. Perkey
*Assistant Examiner*—Minh Phan
(74) *Attorney, Agent, or Firm*—Crowell & Moring LLP

(57) ABSTRACT

A camera system for a vehicle may comprise at least one camera unit that is detachably connectable to the vehicle. The camera unit may be used for at least one camera-based driver-supporting function of the vehicle. The camera system may further comprise a plurality of coupling stations secured to the vehicle to which the at least one camera unit selectively can be coupled.

23 Claims, 3 Drawing Sheets

CAMERA SYSTEM FOR A MOTOR VEHICLE

This application claims the priority of German patent application DE 10 2005 050 363.2, filed Oct. 21, 2005, the disclosure of which is expressly incorporated by reference herein.

BACKGROUND AND SUMMARY OF THE INVENTION

The present invention generally relates to camera systems and, more particularly, to a camera system comprising at least one camera unit, detachably connectable to a motor vehicle, which can be used for at least one camera-based driver-supporting function of the motor vehicle.

One known system in which a camera unit has a detachable connection is described in DE 20 2005 007 509 U1. In this system, the detachable connection of the camera unit permits utilization of the camera unit in connection with various motor vehicles.

Another known camera system is described in JP 2004235964. In this system, the camera unit is configured as a mobile telephone with an integrated camera. In addition to the possibility of utilizing the camera unit in connection with various motor vehicles, this system may allow utilization of the camera unit as a digital camera independent of a motor vehicle. In addition, the camera unit is suitable for carrying out additional functions, in this example the telephone function of the mobile telephone.

Modern motor vehicles often offer many camera-based driver-supporting functions. With conventional camera systems, such as the above-mentioned camera systems, the camera-based driver-supporting functions of modern motor vehicles require taking pictures from various locations.

In addition, to ensure quality, it may be beneficial for a camera unit providing a camera-based driver-supporting function to be precisely or at least reproducibly arranged with respect to the vehicle. With conventional camera systems, however, it may be difficult to ensure that a camera providing a driver supporting function is at least reproducibly arranged with respect to the vehicle. This by way of example can by no means be ensured through setting up the camera mount known from JP 2004235964 at varying places.

Consistent with the present invention, a camera system for a vehicle is provided that expands the utilization possibilities of a camera unit that is detachably connected to the vehicle.

A camera system consistent with the present invention may comprise at least one camera unit detachably connectable to a vehicle and a plurality of coupling stations firmly attached or fixed (i.e., rigidly secured) to the vehicle to which at least one camera unit can be coupled. The camera unit may not be assigned to only a specific coupling station but instead may be used in various coupling stations. The coupling stations can be distributed spatially throughout the vehicle.

Consistent with the present invention, the number of possibilities for utilizing a camera unit detachably connectable to the vehicle may be increased as a result of the fact that the camera unit can be used at various locations distributed over the vehicle. A camera used as a reverse drive camera can provide an image of the rear vehicle surroundings from a central or a side perspective. Furthermore, the number of utilization possibilities may be increased as a result of the camera unit being utilized in connection with various driver-supporting functions of the vehicle. The same camera unit thus, by way of example, can selectively be used as a reverse drive camera or as a lateral curb camera. The mounting of a camera at various coupling stations can result in involvement in various driver-supporting functions, but does not necessarily have to do so.

In one implementation, a camera system consistent with the present invention comprises a plurality of camera units. The camera units can, if they are each coupled to a coupling station, all take part in a single driver-supporting function. The camera units can also be partially involved or each be involved in different functions.

A coupling station may provide a coupled camera unit at least one secure mount and may provide a defined or at least reproducible spatial arrangement of the camera unit with respect to the vehicle. For the coupling, a recess, for example, can accordingly be provided at the coupling station. The recess may be formed as a counterpart to a portion of the camera unit. Likewise a snap or clamp fastening can be provided for holding the camera unit. A coupling station, moreover, can have a drive by means of which the camera unit can be shifted or swiveled with respect to the vehicle.

In vehicles with more than one camera-based driver-supporting function, various approaches are conceivable for assignment of one or more camera units coupled respectively to a coupling station to the functions:

First, at least some of the coupling stations can each be assignable to at least one driver-supporting function of the vehicle. A camera unit coupled to such a coupling station is then involved in that function to which the coupling station is assigned or serves to carry out that function. In this case, there can be either a fixed or a preferred assignment of the functions to the coupling stations. For example, a coupling station in the rear area of the vehicle can be permanently assigned to the function "reverse driving aid through display of the rear surroundings of the vehicle." A camera connected to a specific coupling station is then preferably automatically used and/or configured in a suitable manner for a function assigned to the coupling station. Preferably, no further configuration of the camera is necessary. By way of example, a camera unit coupled to a coupling station in the rear area of the vehicle can then without further configuration serve as a reverse drive camera.

In other embodiments, instead of a fixed assignment, there can also be a preferred assignment of the functions to the coupling stations. Such an arrangement can, for example, result in a temporary automatic function-appropriate configuration and/or application of a camera unit attached to a coupling station which, however, can be later corrected through a subsequent configuration and/or user setting.

Consistent with the present invention, several camera units can be assignable at least partially to at least one driver-supporting function of the vehicle. Such a camera unit is then—independent of the coupling station to which it is coupled—always or preferably involved in the same function or functions. There can be either a fixed or a preferred assignment of the camera units to the functions. A preferred assignment can preferably serve to assign a temporary function to the camera unit. A preferred assignment, however, can by way of example be "overridden" by a configuration and/or user setting differing from this assignment.

Varying and combined forms of the above-described fixed or preferred assignments are also conceivable, consistent with the present invention. For example, a certain camera unit can be involved at certain coupling stations exclusively in a first function. At other coupling stations, that camera can be additionally involved in a second function.

Consistent with the present invention, a coupling currently taking place or an existing coupling of a camera unit to a coupling station can be recognized by the coupling station or a superordinated information processing unit. Recognition by the coupling station or the camera unit itself can accordingly be further reported to a superordinated information processing unit. The superordinated information processing unit thus can for example activate or parameterize a driver-supporting function depending on the coupling of a camera unit to a particular coupling station. The activation or parameterization of driver-supporting functions of the vehicle can thus depend on the presence of camera units in the coupling stations. In the same way, the camera unit itself can be activatable depending on its being coupled to a coupling station.

A camera system consistent with the present invention may comprise camera units of differing types. Also, the type of a camera can be recognized by a coupling station to which the camera unit is coupled or by a superordinated information processing unit. The superordinated information processing unit thus by way of example can activate or parameterize a driver-supporting function depending on the coupling of a camera unit of a specific type. By way of example, a night-vision function can be carried out such that it can be activated only if a camera suitable for receiving infrared light is coupled to a suitable coupling station.

Consistent with the present invention, image signals of at least one camera unit can be transmitted wirelessly from the camera unit to an information processing unit of the vehicle. The coupling stations then do not require any connecting lines and electrical contacts. They can, however, have connecting lines and electrical contacts for provision of electricity for a coupled camera unit.

Consistent with the present invention, at least some of the coupling stations may be connected wirelessly or through lines to an information processing unit of the vehicle. The image signals of a coupled camera unit can then be transmittable to the information processing unit through a coupling station to which the camera unit is coupled.

Consistent with the present invention, at least one camera unit can also be used as a portable digital camera. In this fashion, the number of uses of the camera is thus further increased. If the at least one camera unit, however, is not usable as a portable digital camera, it can be made especially small, light and inexpensive since among other things the display and operating elements usual for a portable camera can be omitted.

Consistent with the present invention, a camera unit does not necessarily have to be limited to the taking of pictures as its essential suitability. It may, for example, also or alternatively be configured as a mobile telephone and thus offer the typical functions of a mobile telephone.

Further, a camera unit consistent with the present invention may be configured suitably to be used in different vehicles. The camera thus may be manufactured in large numbers as a so-called non-variable part. In one example, a vehicle manufacturer or an accessory supplier can provide camera units, with suitable software if needed, for purchase individually or in packets.

Other objects, advantages and novel features of the present invention will become apparent from the following detailed description of the invention when considered in conjunction with the accompanying drawings.

DETAILED DESCRIPTION OF THE DRAWINGS

The following description refers to the accompanying drawing. The implementations set forth in the following description do not represent all implementations consistent with the claimed invention. Instead, they are merely some examples of implementations consistent with the invention. Other implementations may be used and structural and procedural changes may be made without departing from the scope of present invention.

Figure 1:
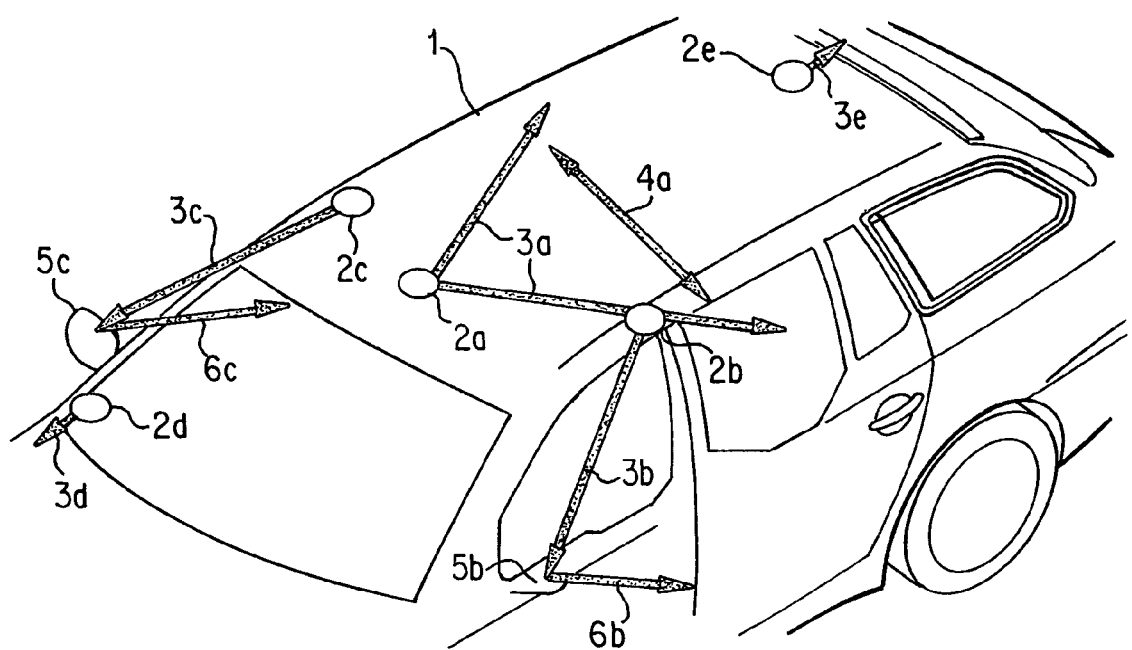
FIG. 1 illustrates a camera system having an exemplary distribution of coupling stations and exemplary alignments of coupled camera units, consistent with the present invention.

FIG. 1 illustrates an exemplary camera system 100 consistent with the present invention. Camera system 100 may be suitable for use in a vehicle 1 and may comprise a plurality of coupling stations 2a, 2b, 2c, 2d, 2e. FIG. 1 depicts an exemplary distribution of the coupling stations in vehicle 1. Other distributions of the coupling stations may also be used.

Coupling stations 2a, 2b, 2c, 2d, 2e may be connected to a central information processing unit (see FIG. 2) included in or coupled to vehicle 1. The central information processing unit serves to control a plurality of camera-based driver-assisting functions. In one configuration, the processing unit may include or be connected to several display units (not shown).

Figure 2:
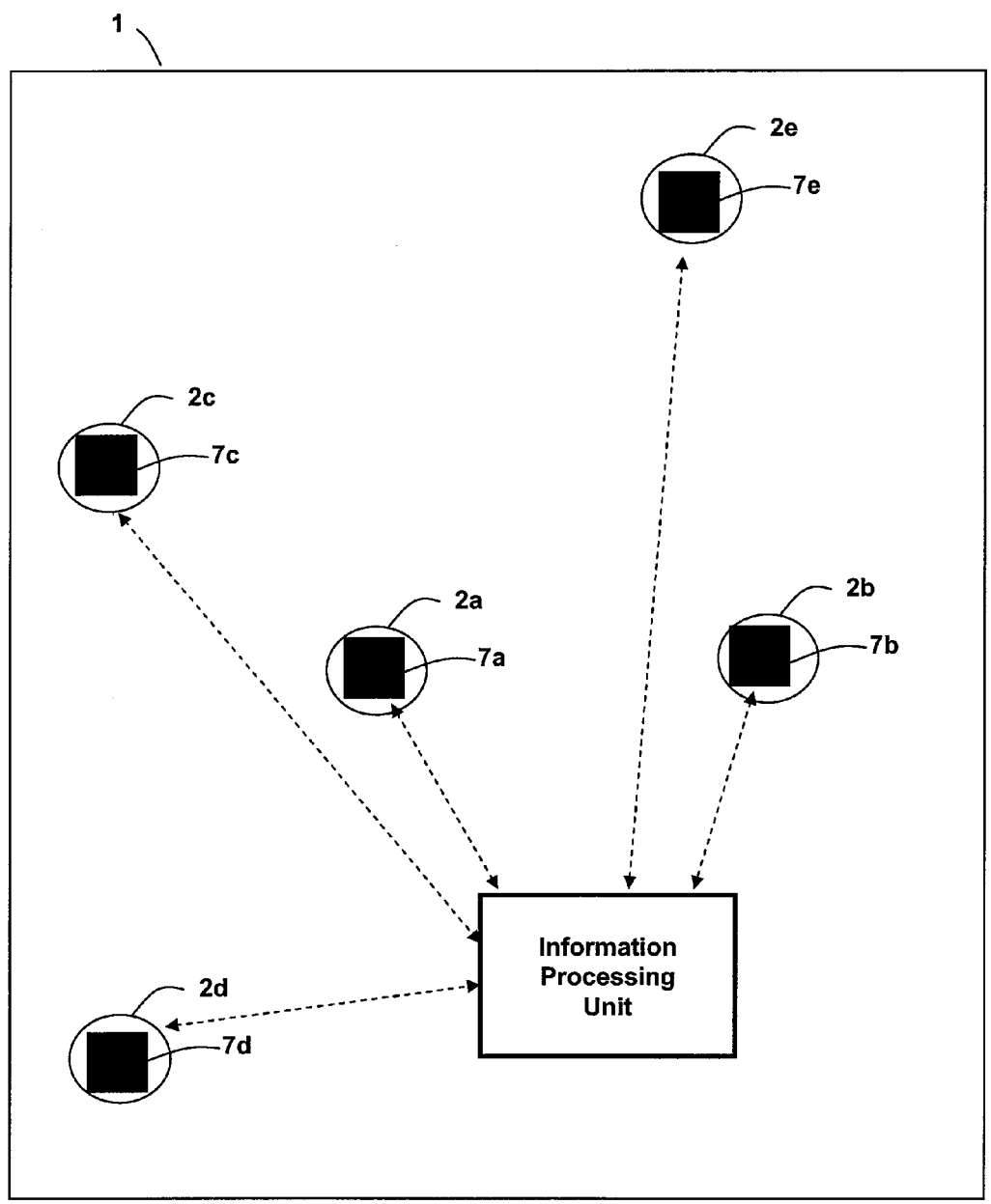
FIG. 2 illustrates the camera system of FIG. 1 with the camera units being shown as coupled to the coupling stations.
Figure 3:
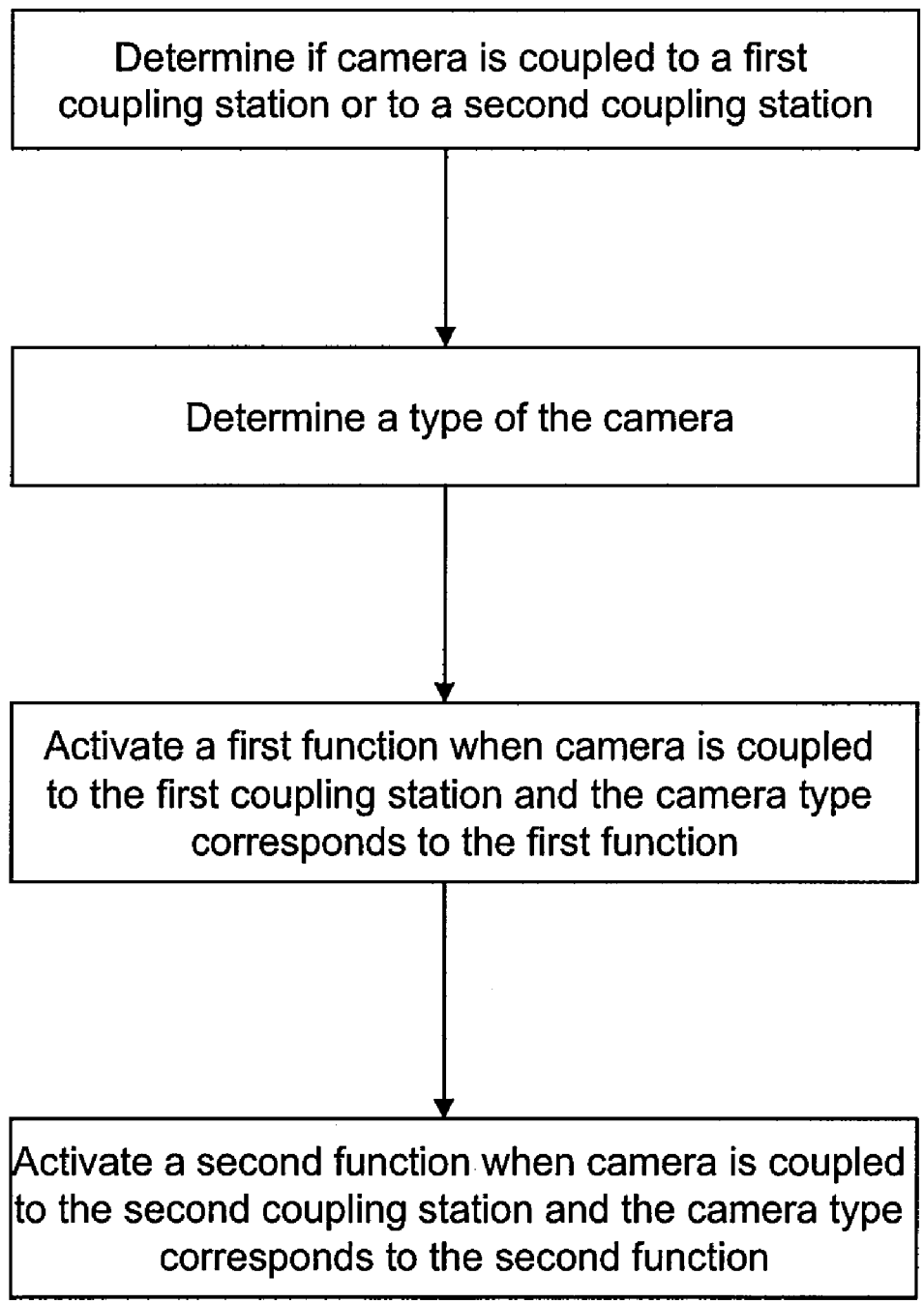
FIG. 3 illustrates an exemplary process for carrying out one embodiment of the invention using the camera system of FIG. 1.

Consistent with the present invention, and as shown in FIG. 2. one or more cameras (e.g., 7a, 7b, 7c, 7d, 7e) can be connected to each coupling station 2a, 2b, 2c, 2d, 2e shown in FIG. 1. For such connections, the camera is clipped into a mount of the respective coupling station. A camera clipped into such a mount can be manually removed again from the mount.

The position and alignment of a camera clipped in a mount with respect to the vehicle is defined through the respective mount. FIG. 1 depicts exemplary alignments of camera units through the arrows 3a, 3b, 3c, 3d, 3e. As indicated by the double arrow 4a in FIG. 1, alignment 3a of a camera clipped into coupling station 2a is manually variable.

Coupling stations 2a, 2b, 2c, 2d, 2e may be provided in vehicle 1 by the manufacturer. Suitable cameras can be acquired and coupled by the user individually or in packets in order to make various functions of vehicle 1 usable. The cameras have a shape suitable for being clipped into the mounts of the coupling stations and may include a standardized data interface, for example, the USB 2.0 interface.

Cameras of various types and configurations can be used with camera system 100. The cameras can, by way of example, have various fixed aperture angles or a configurable aperture angle. They can be suitable for receiving visible light and/or infrared light. They can also be variously equipped. By way of example, a camera can be equipped with operating elements and an image memory so that it can be used outside of a vehicle as a digital camera. The image memory can be read out either upon the next connection to a coupling station by the central information processing unit of vehicle 1 or by a conventional personal computer.

Properties of a connected camera upon connection of the camera to one of the coupling stations may be transferred to the central information processing unit of vehicle 1. In addition, an identification of the particular coupling station may be transmitted to the central information processing unit shown in FIG. 2. The central information processing unit thus can be informed at all times as to which cameras are coupled to which coupling stations, i.e., what configuration of the camera system is present.

Deposited in the central information processing unit is logic according to which different driver-assistance functions of vehicle 1 can be activated or parameterized depending on the configuration of the camera system.

Through the connection of coupling stations 2a, 2b, 2c, 2d, 2e to the central information processing unit, configuration instructions from the central information processing unit can also be transmitted to cameras, to the extent they are configurable or parameterizable. Similarly, the cameras can in this way be activated or deactivated. The taking of freeze-images can also be triggered.

Image data taken by any attached camera—which can be individual images and/or image streams—are transmitted through the connection of the coupling stations and the central information processing unit to the central information processing unit. The image data is then exploited (for example, at the processing unit) for the activated driver-assistance function. The memories necessary for this purpose and the reading out of data can take place on the basis of suitable technologies known in the art.

In the example depicted in FIG. 1, one or more of the following camera-based driver-assistance functions may be available: (1) a front camera function; (2) a curb camera function; (3) a rear seat camera function; and (4) a rear view camera function. Each function may be provided using a particular configuration of cameras and coupling stations. These configurations may vary depending on the particular application or vehicle. Additional details of these exemplary camera-based driver-assistance functions are discussed below.

Front Camera (Coupling Station 2d, Alignment 3d)

In one example, the front camera function may be provided by coupling station 2d and alignment 3d. To provide this function, a camera (not shown) may be connected to vehicle 1 and oriented in the direction of travel of vehicle 1. In the arrangement depicted in FIG. 1, coupling station 2d is at the lower end of the passenger A-column lining and the output of a stream of images is taken to an output monitor which can be seen by the driver. In this fashion, the driver can by means of a camera clipped into coupling station 2d see past a vehicle in front from the extreme passenger position in line of sight 3d and can thus better recognize obstacles and dangers than from his own vantage point. In addition, image data of a camera coupled to coupling station 2d can be retained in an accident data memory of the central information processing unit in the first-in-first-out principle with selectable recording length. Moreover, trips can be recorded as video. The image data transmitted to the central information processing unit in addition can be utilized in combination with an object recognition process.

Curb Camera (Coupling Stations 2b and 2c, Alignments 3b and 3c)

The curb camera function may be provided by coupling stations 2b and 2c and alignments 3b and 3c. Coupling stations 2b and 2c are arranged on the B column or the headliner and are aligned such that any cameras connected are oriented in a line or sight 3b and 3c, respectively, essentially toward the front of the vehicle, but directed downward. Both or only one of coupling stations 2b and 2c can selectively be equipped with cameras. The image data of one or two cameras which may be clipped into the two coupling stations 2b and 2c are displayed to the driver by means of a display unit. By means of side mirrors 5b and 5c, the line of sight of the cameras is redirected at least in part into lines of sight 6b and 6c, respectively. During forward driving or see-sawing, an image of the surroundings is thus available to the driver such as in the case of a lowered passenger side mirror. Side mirrors 5b and 5c in the process continue to be fully usable in conventional manner for the driver in their regular position.

Rear Seat Camera (Coupling Station 2a, Alignment 3a)

To provide the rear seat camera function, coupling station 2a may be arranged in the interior of the vehicle on the headliner or on the overhead consol. A camera which may be coupled to coupling station 2a is manually alignable in rear, lowered line of sight 3a. As indicated by the double arrow 4a in FIG. 1, alignment 3a of a camera clipped into coupling station 2a can be manually varied. By means of a camera which may be coupled to coupling station 2a and a display of the camera image for the driver, it is possible by way of example to monitor persons or animals on the rear seat without the driver having to turn his head. In the same way, a camera which may be coupled to coupling station 2a can serve as a web camera for rear passengers.

Rearview Camera (Coupling Station 2e, Alignment 3e)

To provide the rearview camera function, coupling station 2e may be arranged on the headliner close to the rear window. A camera which may be coupled to coupling station 2e is oriented the in rear line of sight 3e. By means of such a rearview camera or reverse drive camera, a conventional rearview mirror can be replaced or supplemented. This can be advantageous in particular in the case of tinted glass, a raised sun screen or in the event of complete utilization of the cargo space. Such a rearview camera or reverse drive camera can also provide data for an accident data memory and/or for a video recording of trips.

In addition to significantly expanded sight possibilities when the automobile is in motion, aspects of the present invention offer the driver many varied comfort and documentation functions. Further, the user of the vehicle does not necessarily have to equip the vehicle with a multiplicity of expensive cameras. Instead, the user can select only those functions that correspond to preferences and needs. In like manner, the user can optionally choose by means of only a single or few cameras various functions by coupling the cameras to different coupling stations.

Aspects of the present invention may allow the user of a vehicle to develop a variable network of cameras according to specific personal requirements and also change it subsequently if needed. Changes of the current equipping of the coupling stations with cameras are recognized by a central information processing unit and the network can be completely or partially automatically reconfigured as a reaction to such a change. This reconfiguration can by way of example relate to the assignment of cameras or coupling stations to certain functions of the vehicle. As a result of such a reconfiguration, parameters of the functions and/or adjustable parameters of the cameras (e.g., adjustable zoom factor and/or adjustable focal length) can be changed. The driver of the vehicle can also be requested to cause or perform a complete or partial reconfiguration.

Consistent with the present invention, uniform software can be provided for many system configurations, which may be particularly advantageous to vehicle manufactures. This is possible since a multiplicity of camera-based driver-supporting functions are based on the common principle of image recording/image processing/information output. Essential differences frequently exist only within the software between image recording and information output. In the described exemplary embodiments, the customer more or less on his own takes care of the activation or connection of specific camera-based functions. If needed, a data medium with a program for adapting or expanding the software configuration of the vehicle can be issued to the customer together with a camera which can be coupled. In like manner, such an adaptation or expansion of the software configuration of the vehicle can be performed in the shop or at another location through a wireless connection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A camera system for a vehicle, comprising:
   at least one camera unit detachably coupled to the vehicle, the at least one camera unit operable to provide at least one camera-based driver-supporting function,
   a plurality of coupling stations fixed to the vehicle that are operable to couple to the at least one camera unit, wherein the plurality of coupling stations includes a first coupling station associated with a first function; and
   a processor coupled to the plurality of coupling stations, wherein the processor is configured to:
      identify a type of the at least one camera,
      determine whether the type is compatible with the first function, and
      activate the first function when the at least one camera is coupled to the first coupling station and the type is compatible with the first function.

2. The camera system according to claim 1, wherein the plurality of coupling stations are spatially distributed on the vehicle.

3. The camera system according to claim 1, wherein the plurality of coupling stations are at least partially assigned to at least one driver-supporting function of the vehicle.

4. The camera system according to claim 1, wherein the camera system comprises a plurality of camera units.

5. The camera system according to claim 4, wherein the plurality of camera units are at least partially assigned to at least one driver-supporting function of the vehicle.

6. The camera system according to claim 4, wherein the plurality of camera units are of differing types, and wherein a type of a first camera unit is recognized by at least one of a coupling station to which the first camera unit is coupled and an information processing unit.

7. The camera system according to claim 1, wherein at least one of an activation and a parameterization of driver-supporting functions of the vehicle is dependent on a presence of camera units in the coupling stations.

8. The camera system according to claim 1, wherein image signals of the at least one camera unit are transmitted wirelessly from the camera unit to an information processing unit of the vehicle.

9. The camera system according to claim 1, wherein the plurality of coupling stations are connected at least in part wirelessly or through lines to an information processing unit of the vehicle, and wherein image signals of the at least one camera unit are transmitted to the information processing unit via a coupling station to which the camera unit is coupled.

10. The camera system according to claim 1, wherein the at least one camera unit is configured as a portable digital camera.

11. A camera system, comprising:
    at least one moveable camera unit;
    a first coupling station including a first camera mount and assigned a first function;
    a second coupling station including a second camera mount and assigned a second function,
    wherein the at least one camera performs the first function when coupled to the first coupling station via the first camera mount, and wherein the at least one camera performs the second function when coupled to the second coupling station via the second camera mount; and
    a processor configured to:
       identify a type of the at least one camera,
       determine whether the type is compatible with the first function, and
       activate the first function when the at least one camera is coupled to the first coupling station and the type is compatible with the first function.

12. The camera system of claim 11, wherein the first coupling station and the second coupling station are fixed to a vehicle.

13. The camera system of claim 12, wherein the first coupling station and the second coupling station are fixed to different locations respectively on the vehicle.

14. The camera system of claim 12, wherein the first function is a first driving support function and the second function is a second driving support function different.

15. The system of claim 12, wherein the first coupling station is assigned a first function associated with one of: displaying an environment external to and behind the vehicle, displaying an environment external to and in front of the vehicle, and displaying an environment internal to the vehicle.

16. The system of claim 15, wherein the second coupling station is assigned a second function that is different than first function and selected from: displaying an environment external to and behind the vehicle, displaying an environment external to and in front of the vehicle, and displaying an environment internal to the vehicle.

17. The system of claim 11, wherein the at least one camera is automatically configured to perform the first function when coupled to the first coupling station, and wherein the at least one camera is automatically configured to perform the second function when coupled to the second coupling station.

18. The system of claim 11, wherein the processor is further configured to:
    determine whether the at least one camera is coupled to the first or second coupling station;
    activate the first function when the at least one camera is coupled to the first coupling station; and
    activate the second function when the at least one camera is coupled to the second coupling station.

19. A method of providing a camera-based driving-supporting function, the method comprising the acts of:
    determining whether a moveable camera is coupled to a first coupling station fixed to a vehicle or a second coupling station fixed to the vehicle;
    determining a type of the moveable camera;
    activating a first function when the moveable camera is coupled to the first coupling station and the type corresponds to the first function; and
    activating a second function when the camera is coupled to the second coupling station and the type corresponds to the second function.

20. The method of claim 19, further comprising assigning the first function to the first coupling station and assigning the second function to the second coupling station.

21. The method of claim 19, wherein the first function is at least one driving support function selected from: displaying an environment external to and behind the vehicle, displaying an environment external to and in front of the vehicle, and displaying an environment internal to the vehicle.

22. The method of claim 21, wherein the second function is at least one driving support function different than the first function and selected from: displaying an environment external to and behind the vehicle, displaying an environment external to and in front of the vehicle, and displaying an environment internal to the vehicle.

23. A camera system comprising:

first coupling means for securing a moveable camera to a first location on a vehicle;

second coupling means for securing the moveable camera to a second location on the vehicle;

means for determining whether the moveable camera is coupled to the first coupling station or the second coupling station;

means for determining a type of the moveable camera;

means for activating a first function when the moveable camera is coupled to the first coupling means and the type is suitable for the first function; and means for activating a second function when the moveable camera is coupled to the second coupling means and the type is suitable for the second function.

* * * * *